US006625674B1

(12) United States Patent
Kennel et al.

(10) Patent No.: US 6,625,674 B1
(45) Date of Patent: Sep. 23, 2003

(54) METHOD AND APPARATUS FOR STATE-INDEPENDENT NON-INTERRUPT-DRIVEN HANDSHAKE WITH POSITIVE ACKNOWLEDGEMENT

(75) Inventors: John C. Kennel, Austin, TX (US); Jayesh M. Patel, Austin, TX (US); Maulin Ishwarbhai Patel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/160,027

(22) Filed: Sep. 24, 1998

(51) Int. Cl.[7] ................................................. G06F 3/00
(52) U.S. Cl. .......................................... 710/58; 709/237
(58) Field of Search ................................. 709/312, 213, 709/237; 714/56; 711/150; 710/36, 39, 58, 53, 55, 56

(56) References Cited

U.S. PATENT DOCUMENTS

| | | | | |
|---|---|---|---|---|
| 4,827,115 A | * | 5/1989 | Uchida et al. ............... | 235/492 |
| 5,479,582 A | * | 12/1995 | Abrams .......................... | 710/1 |
| 5,983,303 A | * | 11/1999 | Sheafor et al. .............. | 710/126 |
| 6,012,142 A | * | 1/2000 | Dokic et al. .................... | 713/2 |
| 6,134,607 A | * | 10/2000 | Frink ........................... | 710/22 |
| 6,145,007 A | * | 11/2000 | Dokic .......................... | 709/230 |

OTHER PUBLICATIONS

M. Morris Mano, "Computer System Architecture", 1982, Prentice–Hall, pp. 428—434.*

* cited by examiner

Primary Examiner—John Follsansbee
Assistant Examiner—Li Zhen
(74) Attorney, Agent, or Firm—Barry S. Newberger; Winstead Sechrest & Minick P.C.; Leslie A. Van Leeuwen

(57) ABSTRACT

A method and apparatus for non-interrupt-driven handshake with acknowledgment are provided. A first software resource in a data processing system communicates a data value to a second software resource by writing the data value to a first register field, where it may be read by the second software resource. On writing the data, the first resource sets a write signal in a second register field. If the second software resource attempts to read the data value before it is written by the first resource, a reset value in the second field informs the second resource that any data in the first field is invalid. The second resource then sets a first predetermined value in a third field which informs the first resource that the second has attempted a read. If the data is valid when the second resource attempts the read, the data is retrieved, and the second resource echos the value in a fourth field. The second resource also sets a second predetermined data value in the third field which informs the first resource that the data has been read. The first resource then reads the value echoed in the fourth field to determine that the read by the second resource was error free.

17 Claims, 3 Drawing Sheets

METHOD AND APPARATUS FOR STATE-INDEPENDENT NON-INTERRUPT-DRIVEN HANDSHAKE WITH POSITIVE ACKNOWLEDGEMENT

TECHNICAL FIELD

The present invention relates in general to a data processing system and, in particular, to the passing of data between software resources, and the assurance of data integrity therein, in data processing systems.

BACKGROUND INFORMATION

Communicating software resources within a data processing system may need to pass data among themselves. If the software resources do not have an interrupt mechanism or a polling mechanism, the only way to transfer data from a first software resource to a second software resource is for the first software resource to leave the data for the software for the second software resource to collect.

If, however, the data is simply left at a location known both to the first and second resources, there is no assurance that data integrity is maintained. The second software resource may attempt to collect the data it requires before the first software resource has stored the information. In such a case, the data value collected by the second software resource will be erroneous, and there is no mechanism to inform either the first resource or the second resource that the data value is erroneous. Moreover, even if the second resource gathers the data after it has been stored by the first resource, there is no mechanism to ensure that an error in reading the data has not occurred.

Therefore, there is a need in the art for a mechanism which ensures data integrity when data is passed between communicating software resources that have no interrupt or polling mechanisms. In particular, there is a need in the art for a mechanism that informs the receiving software that valid data is available, and which includes a mechanism allowing the sending software to determine when the receiving software has suffered a read error.

SUMMARY OF THE INVENTION

The aforementioned needs are addressed by the present invention. Accordingly, there is provided, in a first form, a method of non-interrupt-driven handshake with positive acknowledgment. The method includes the steps of writing a data value to a first register field, and setting a write signal in a second register field. Also included are the steps of reading the write signal, and, if the write signal is set, reading the data value, and setting an acknowledge signal to a first predetermined value in a third register field, wherein the acknowledge signal signals a first resource that a second resource has attempted a read of the data value.

There is also provided, in a second form, a data processing system for non-interrupt-driven handshake with positive acknowledgment. The data processing system circuitry operable for writing a data value to a first register field, and setting a write signal in a second register field. The data processing system also includes circuitry operable for reading the write signal, and, if the write signal is set, reading the data value, and setting an acknowledge signal to a first predetermined value in a third register field, wherein the acknowledge signal signals a first resource that a second resource has attempted a read of the data value.

Additionally, there is provided, in a third form, a computer program product operable for non-interrupt-driven handshake with positive acknowledgment, wherein the program product operable for storage on machine readable storage media includes programming for writing a data value to a first register field, and setting a write signal in a second register field. Further included is programming for reading the write signal, and, if the write signal is set, reading the data value and setting an acknowledge signal to a first predetermined value in a third register field, wherein the acknowledge signal signals a first resource that a second resource has attempted a read of the data value.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
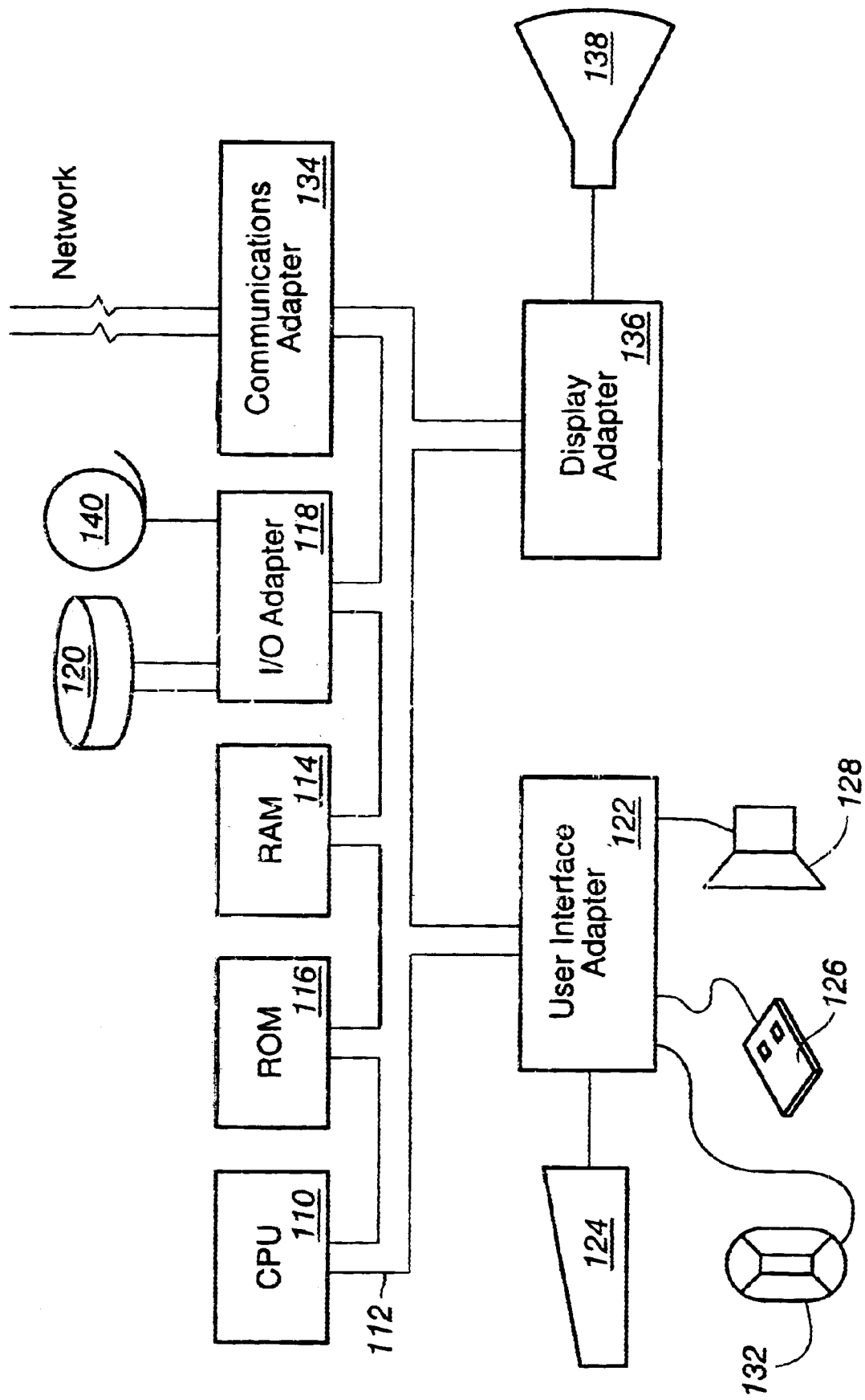
FIG. 1 illustrates, in block diagram form, a data processing system in accordance with one embodiment of the present invention.

The present invention provides a state-independent non-interrupt-driven handshake mechanism which supports data communication between software resources. A first software resource is permitted to leave data for a second software resource to collect and verification of the data as collected by the second resource is provided. There is also provided a mechanism for the second resource to determine if the data it has found is valid, and the second software resource is furnished with a mechanism by which it can signal the first resource that it has previously attempted to collect the data to be passed between the resources.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110. The handshake register and non-interrupt-driven handshake mechanism of the present invention may be included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. Alternatively, the handshake register and handshake mechanism of the present invention may be included in RAM 114. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
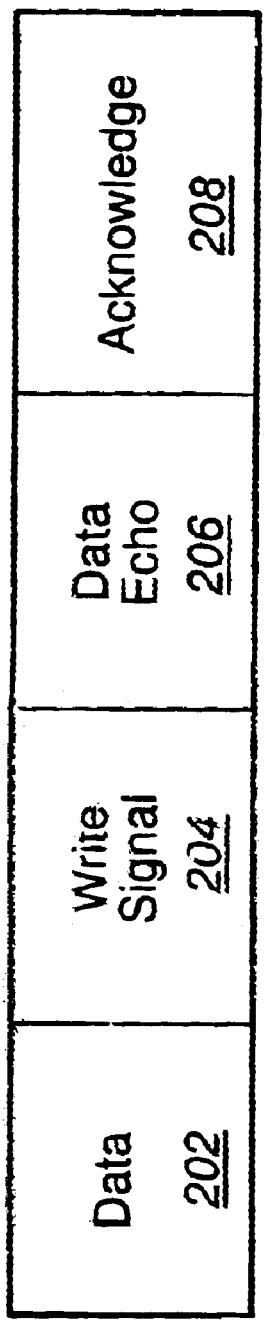
FIG. 2 illustrates a handshake register in accordance with an embodiment of the present invention.

Refer now to FIG. 2 which illustrates handshake register 200, which may be used for exchange of data between two software resources, in accordance with the principles of the present invention. Handshake register 200 may, in an embodiment of the present invention, be located in RAM 114, in FIG. 1. Alternatively, handshake register 200 may be included in CPU 110. Handshake register 200 includes data field 202, write signal field 204, data echo field 206, and acknowledge (ACK) field 208. Data field 202 contains data to be communicated between the first and second software resources. Write signal field 204 holds a data value that indicates that a data value in data field 202 is valid, as will be described further in conjunction with FIG. 3. Data echo field 206 contains an echo data value and ACK field 208 includes an acknowledgment data value, both of which will also be described further in conjunction with FIG. 3.

Figure 3:
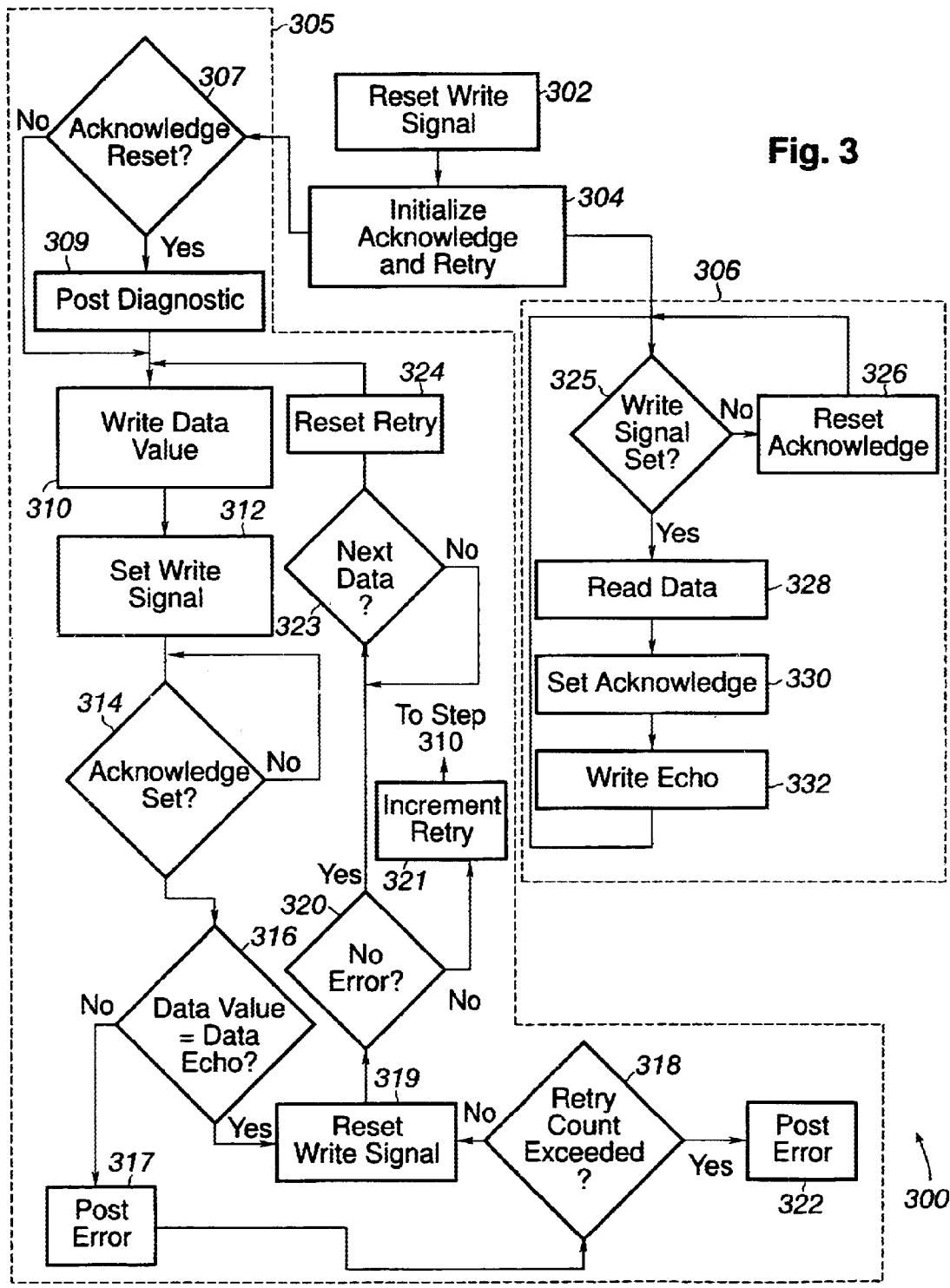
FIG. 3 illustrates, in flowchart form, a method of non-interrupt-driven handshake in accordance with one embodiment of the present invention.

Referring now to FIG. 3, there is illustrated, in flow chart form, non-interrupt-driven handshake mechanism 300 according to the present invention. In step 302, the write signal value and write signal field 204, is reset. In step 304, an acknowledge data value is initialized to a predetermined value and a retry counter is initialized. Method 300 then proceeds along two subprocesses, subprocess 306 and subprocess 305. Subprocess 305 and subprocess 306 may also be referred to as threads. Subprocess 305 is executed by the first software resource which is communicating data to the second software resource. The second resource executes subprocess 306.

In step 307, subprocess 305 determines if the data value in ACK field 208 has been reset. If the data value has been reset, then, as discussed in conjunction with steps 325 and 324 below, subprocess 306 has attempted to read data before subprocess 305 has written the data to be communicated between the first and second resources. Although this may not reflect a software error, a diagnostic message is posted in step 309 using standard operating system error procedure to inform a system administrator or other user who may then take action if necessary. Otherwise, in step 307, subprocess 305 continues with step 310.

Subprocess 305 writes the data to be communicated in step 310, and in step 312 sets a write signal value in write signal field 204 in handshake register 200, FIG. 2.

In step 314, subprocess 305 tests the data value in ACK field 208. If a data value has been set, subprocess 305 then examines the data value in data echo field 206. Otherwise, in step 314, subprocess 305 loops until the data value in ACK field 208 has been set. When ACK field 208 has been set, subprocess 305 knows that the second software resource has retrieved the data the first resource has communicated.

In step 316, subprocess 305 compares the data value in data echo field 206 with the data written to data field 202, in step 310. If the data value in data echo field 206 is the same as the data written to data field 202 in step 310, then subprocess 305 knows that the second resource properly receives the data value the first resource is communicating to the second resource. This will be further discussed in conjunction with subprocess 306.

If, however, in step 316, the data value in data echo field 206 does not equal the data value written in step 310, then the first resource knows that an error has occurred in the receipt of the data value by the second process, and in step 317 an error is posted. The error is passed to the system, however, this error condition is not a fatal error and the system does not go down. The second resource is notified through standard operating system error log procedures.

In step 318 the retry counter is tested and if a preselected number of retries is not exceeded, subprocess 305 retries to write the data. In step 319, the write signal in field 204 is reset and, because an error has been posted in step 317, step 320 takes the "no" branch wherein subprocess 305 increments the retry counter, in step 321, and then returns to step 310 to rewrite the data.

If, however, in step 318, the preselected number of retries is exceeded, this may signal a system error, for example a hardware fault. In step 322, an error is posted via standard operating system procedures to notify the system administrator whereby corrective action may be taken.

If, in step 316, subprocess 305 has determined that the second resource received the data value successfully, in step 319, it resets the write signal value in write signal field 204.

Because no error has been posted, step 320 proceeds via the "yes" branch to step 323. In step 323, subprocess 305 loops until the first resource has a next data value to communicate with the second resource. When the next data value is to be communicated, subprocess 305 resets the retry counter, in step 324, and returns to step 310.

Subprocess 306 is executed by the second resource, and may be asynchronous with subprocess 305. Subprocess 306 tests the write signal value in write signal field 204, in step 325. If the write signal has not been set, subprocess 306 knows that the first resource has not yet written its data value into data field 202. In step 326, the data value in ACK 208 is reset to a third data value. In this way, subprocess 305, in step 314, knows that the second resource has looked for a data value in data field 202, as discussed hereinabove.

If, however, in step 325, the write signal data value, in write signal field 204, has been set to the second preselected value, subprocess 306 knows that the first resource has written the data value to be communicated in data field 202. In step 328, subprocess 306 reads the data value from data field 202, and in step 330, sets the second preselected data value in ACK field 208. In this way, subprocess 305, in step 314, knows that the second process, via subprocess 306, has read the data value from data field 202.

In step 332, subprocess 306 writes the data value retrieved from data field 202 into write echo field 206. Thus, when the first resource, via subprocess 305, tests the contents of data echo field 206, in step 316, it can determine whether the second resource, through subprocess 306, has correctly read the data value the first resource has communicated to the second resource.

In this way, non-interrupt-driven handshake process 300 permits the transfer of data between the first software resource and the second software resource when the first and second software resources do not have interrupt or polling mechanisms. The write/read/echo/acknowledge mechanism allows the second software resource to determine when the first software resource has written data to be communicated, and permits the first software resource to determine when the second resource has attempted a read, as well as determining if the second software resource has correctly read the data communicated by the first software resource.

Although the present invention and its advantages have been described in detail, it should be understood that various changes, substitutions and alterations can be made herein without departing from the spirit and scope of the invention as defined by the appended claims.

What is claimed is:

1. A method of non-interrupt driven handshake with positive acknowledgment comprising the steps of:
   writing a data value to a first register field;
   setting a write signal in a second register field;
   reading said write signal;
   if said write signal is set, reading said data value, and seeing an acknowledge signal to a first predetermined value in a third register field, wherein said acknowledge signal signals a first resource that a second resource has attempted a read of said data value; and
   if said write signal is not set, resetting said acknowledge signal to a second predetermined value.

2. The method of claim 1 further comprising the step of echoing said data value to a fourth register field.

3. The method of claim 2 further comprising the steps of:
   comparing said data value echoed to said fourth register with said data value written in said step of writing to said first register field; and
   if said data value echoed to said fourth register field does not equal said data value written in said writing step, posting an error signal.

4. The method of claim 3 further comprising, if said data value echoed to said fourth register field equals said data value written in said writing step, the steps of:
   resetting said write signal; and
   if a next data value is to be communicated, writing said next data value to said first register field.

5. The method of claim 1 further comprising the steps of:
   determining if said acknowledge signal is set to said first predetermined value; and
   if said acknowledge signal is reset to said second predetermined value, repeating said step of determining if said acknowledge signal is set.

6. The method of claim 1 further comprising the step of retrying said steps of writing a data value, setting a write signal, and reading said write signal and setting said acknowledge signal for at least one retry and not exceeding a preselected number of retries.

7. A data processing system for non-interrupt driven handshake with positive acknowledgment comprising:
   circuitry operable for writing a data value to a first register field;
   circuitry operable for setting a write signal in a second register field;
   circuitry operable for reading said write signal;
   circuitry operable for, if said write signal is set, reading said data value and setting an acknowledge signal to a first predetermined value in a third register field, wherein said acknowledge signal signals a first resource that a second resource has attempted a read of said data value; and
   circuitry operable for, if said write signal is not set, resetting said acknowledge signal to a second predetermined value.

8. The data processing system of claim 7 further comprising circuitry operable for echoing said data value to a fourth register field.

9. The data processing system of claim 8 further comprising:
   circuitry operable for comparing said data value echoed to said fourth register with said data value written in said step of writing to said first register field; and
   circuitry operable for if said data value echoed to said fourth register field does not equal said data value written in said writing step, posting an error signal.

10. The data processing system of claim 9 further comprising circuitry operable for, if said data value echoed to said fourth register field equals said data value written in said writing step, resetting said write signal; and
   circuitry operable for, if a next data value is to be communicated, writing said next data value to said first register field.

11. The data processing system of claim 7 further comprising:
   circuitry operable for determining if said acknowledge signal is set to said first predetermined value; and
   circuitry operable for, if said acknowledge signal is reset to said second predetermined, repeating said step of determining if said acknowledge signal is set.

12. The data processing system of claim 7 further comprising circuitry operable for retrying said writing a first data value, setting a write signal, reading said write signal and setting said acknowledge for at least one retry and not exceeding a preselected number of retries.

13. A computer program product operable for non-interrupt-driven handshake with positive acknowledgment, the program product operable for storage on machine readable storage media comprising:

programming for writing a data value to a first register field;

programming for setting a write signal in a second register field;

programming for reading said write signal;

programming for, if said write signal is set reading said data value, and setting an acknowledge signal to a first predetermined value in a third register field, wherein said acknowledge signal signals a first resource that a second resource has attempted a read of said data value; and programming for, if said write signal is not set, resetting said acknowledge signal to a second predetermined value.

14. The program product of claim 13 further comprising programming for echoing said data value to a fourth register field.

15. The program product of claim 14 further comprising:

programming for comparing said data value echoed to said fourth register with said data value written in said step of writing to said first register field; and programming for, if said data value echoed to said fourth register field does not equal said data value written in said writing step, posting an error signal.

16. The program product of claim 15 further comprising:

programming for, if said data value echoed to said fourth register field equals said data value written in said writing step, resetting said write signal; and programming for, if a next data value is to be communicated, writing said next data value to said first register field.

17. The program product of claim 13 further comprising:

programming for determining if said acknowledge signal is set to said first predetermined value; and programming for, if said acknowledge signal is reset to said second predetermined value, repeating said step of determining if said acknowledge signal is set.

* * * * *

UNITED STATES PATENT AND TRADEMARK OFFICE
CERTIFICATE OF CORRECTION

PATENT NO. : 6,625,674 B1
DATED : September 23, 2003
INVENTOR(S) : John C. Kennel, Jayesh M. Patel and Maulin Ishwarbhai Patel It is certified that error appears in the above-identified patent and that said Letters Patent is hereby corrected as shown below:

<u>Column 5,</u>
Line 55, please replace "seeing" with -- setting --.

<u>Column 6,</u>
Line 21, please replace "non-interrupt driven" with -- non-interrupt-driven --.

Signed and Sealed this

Eighth Day of June, 2004

JON W. DUDAS
*Acting Director of the United States Patent and Trademark Office*